United States Patent [19]

Yanagi et al.

[11] Patent Number: 4,937,709
[45] Date of Patent: Jun. 26, 1990

[54] BACK LIGHTING DEVICE FOR A LIQUID CRYSTAL PANEL

[75] Inventors: Eiichi Yanagi; Takumi Fukunishi, both of Kanagawa; Osamu Shoji, Tokyo; Naoki Yoshida, Kanagawa, all of Japan

[73] Assignees: Tosoh Corporation, Yamagushi; Nippon Silica Glass Co., Ltd., Tokyo, both of Japan

[21] Appl. No.: 393,208

[22] Filed: Aug. 14, 1989

[30] Foreign Application Priority Data

Aug. 18, 1988 [JP] Japan .................................. 63-203796
Oct. 13, 1988 [JP] Japan .................................. 63-255911

[51] Int. Cl.$^5$ ............................................. F21V 8/00
[52] U.S. Cl. ...................................... 362/31; 362/223
[58] Field of Search ............... 362/31, 311, 327, 331, 362/223

[56] References Cited

U.S. PATENT DOCUMENTS

| | | | |
|---|---|---|---|
| 2,347,665 | 5/1944 | Christensen et al. | 362/31 |
| 3,132,810 | 5/1964 | Ostensen | 362/31 |
| 4,729,067 | 3/1988 | Ohe | 362/31 |
| 4,811,507 | 3/1989 | Blanchet | 362/31 |
| 4,860,171 | 8/1989 | Kojima | 362/31 |

FOREIGN PATENT DOCUMENTS 58-38186 3/1983 Japan .

Primary Examiner—Ira S. Lazarus
Assistant Examiner—Richard R. Cole
Attorney, Agent, or Firm—Sughrue, Mion, Zinn, Macpeak & Seas

[57] ABSTRACT

A back lighting device for a liquid crystal display has a light scattering coating in the form of dots covering the light emitting surface of a photo-conductive plate. The coating covers 3–50% of the surface nearest an end thereof adjacent a linear light source and covers 80–100% of the surface farthest from the light source. The variation of the coating rate across the surface produces uniform distribution of emitted light from the back lighting device.

2 Claims, 3 Drawing Sheets

A DISTANCE FROM
A LIGHT SOURCE

BACK LIGHTING DEVICE FOR A LIQUID CRYSTAL PANEL

BACKGROUND OF THE INVENTION

The present invention relates to a back lighting device for a liquid crystal panel, for irradiating a transmissive panel from the rear.

Recently, thin display devices provided with back lighting mechanisms have been used as the display devices for word processors, lap-top computers, and the like. The back lighting makes it easy to see the information on the screen.

Examples of such back lighting mechanisms include one in which a plurality of luminous bodies such as cold cathode tubes or the like and a light scattering plate are disposed just under a panel, one constituted by an electroluminescence (EL) face luminous body, and so on. In those back lighting devices, however, there have been problems, such as the display device being relatively thick, in the case of the former example, or the display device having insufficient luminance and a relatively short life, in the case of the latter example.

There have been various trials on back lighting devices of the type including a photo-conductive plate having a linear light source on a side edge portion of a transmissive plate. However, light entering through the end surface of the transmissive plate cannot be luminous in a face shape without any change, so that it is necessary to make the light emitting surface and/or the back surface of the transmissive plate subject to a treatment such as surface roughing, application of a light scattering material thereon, or the like. If such treatment is performed uniformly over the entire surface of the transmissive plate, however, the farther from the light source, the lower the luminance. It is accordingly necessary to change the treatment condition in order to make the luminance uniform. To this end, various devices have been made.

Further, there have been proposals in which a groove is formed in a transmissive plate per se, and others in which a transmissive plate is formed in a wedge shape. Nevertheless, it has not yet been possible to provide uniform light distribution.

SUMMARY OF THE INVENTION

It is therefore an object of the present invention to solve the foregoing problems of the prior art.

In order to attain the foregoing object of the present invention, the back lighting device for a liquid crystal panel comprises a photo-conductive plate having one surface coated with a light scattering material in a certain state and a light scattering plate and a second surface provided with a light reflecting plate.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENT

An embodiment of the present invention will be described in detail with reference to the drawings.

Figure 1:
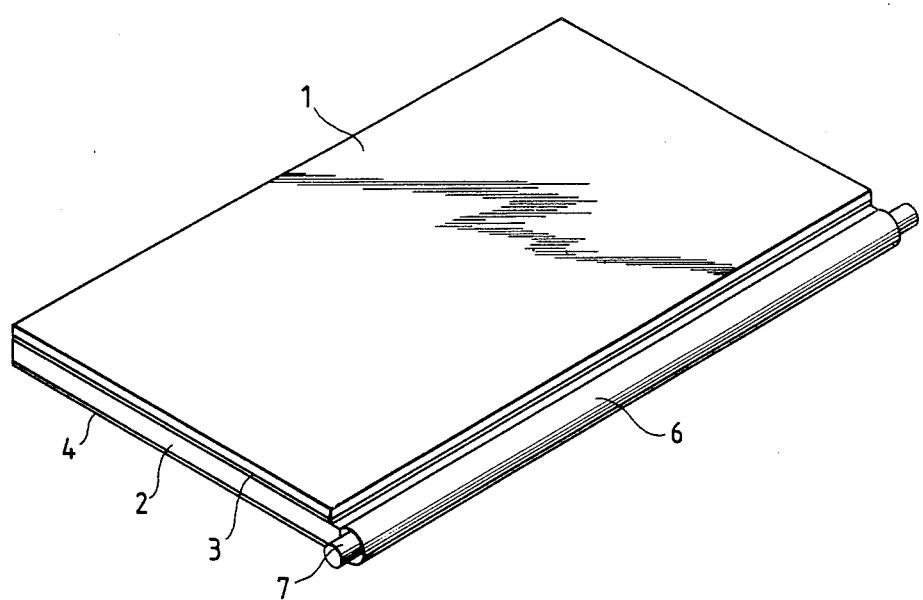
FIGS. 1 and 2 are perspective and sectional views illustrating an embodiment of the present invention.
Figure 2:
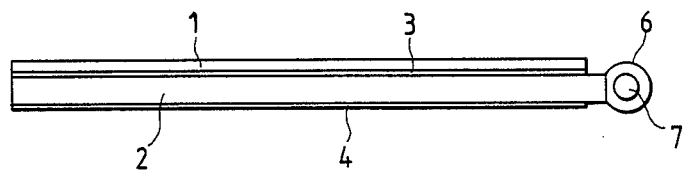

FIG. 1 is a perspective view illustrating an embodiment of the present invention, and FIG. 2 is a sectional view thereof. In FIGS. 1 and 2, the reference numeral 1 represents an ordinary liquid crystal display panel. The reference numeral 2 represents a photo-conductive plate made of a transmissive material which may be, for example, quartz, glass, or a transmissive synthetic resin, such as acryl-series resin, or the like, so long as the material can transmit light. The reference numeral 3 represents a light scattering plate for scattering and transmitting light emitted from the surface of the photo-conductive plate 2. The light scattering plate 3 is preferably constituted by a transparent plate having a surface which has been subjected to surface treatment, a thin plate formed of a transparent plate forming material mixed with light scattering particles, or the like. Preferably, the light scattering plate 3 has a quality of low light absorption.

The photo-conductive plate 2 also has light scattering material 5 coated thereon. This light scattering material has a refractive index higher than that of the photo-conductive plate, and is obtained by dispersing white fine powder, for example, $TiO_2$, $BaSO_4$, or $BaO_2$, into a transparent binder of resin or the like. This light scattering material is provided on the surface of the photo-conductive plate by printing or the like so as to coat the surface partially. At that time, it is necessary that the coating satisfies the following conditions.

The coated portion is made of a light scattering material provided in the form of dots or points, which are not limited in shape and may be circular or rectangular shape. The size of each dot is selected to be within a range of from 0.2 mm to 3 mm across in order to provide uniform luminance. In the vicinity of a linear light source, which will be described later, the coating covers from 3% to 50% of the area of the photo-conductive plate. In the regions furthest from the linear light source, the coating covers from 80% to 100% of the area of the photo-conductive plate. Further, the coating rate increases with distance from the light source. The term "coating rate" as used herein means the ratio of the area of the surface of a photo-conductive plate coated with a light scattering material to the whole area of the photo-conductive plate. The coating rate y increases with distance x from the linear light source, such that it is proportional to the distance x raised to a power n, such as $y = Kx^n$, where n is between 1 and 3, and preferably is between 1.7 and 3, and K generally represents a proportionality factor.

A light reflection plate 4 is disposed on the bottom surface of the photo-conductive plate 2 so that light scattered by the light scattering material in the direction opposite to the light emitting direction and light reflected in the same direction by the light scattering plate 3, or the like, is reflected back towards the light emitting surface to make it possible to increase the total quantity of emitted light. The light reflection plate 4 is disposed to lie over almost the entire surface of the photo-conductive plate.

The reference numeral 7 represents a linear light source disposed close to at least one side portion of the photo-conductive plate so that the central axis thereof is substantially parallel to the plane of the photo-conductive plate. Linear light sources may be provided respectively at the opposite side portions of the photo-conductive plate. In this case, of course, a light scattering material is to be given to the photo-conductive plate satisfying the above-mentioned conditions of the present invention.

Having a main portion configured as described above according to the present invention, the device is used as a back light device for a liquid crystal panel.

Figure 3:
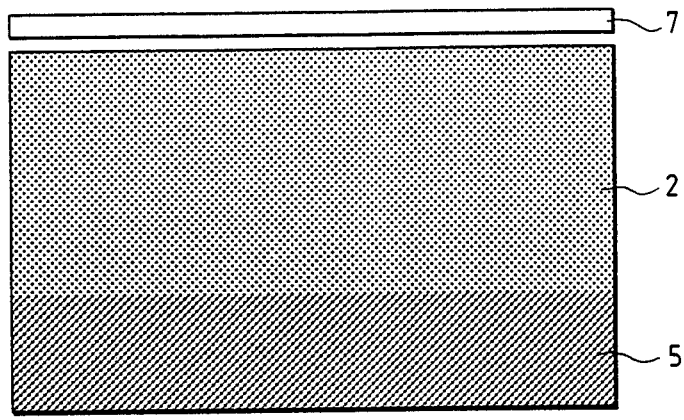
FIG. 3 is a schematic diagram illustrating a light scattering coating on the surface of a photo-conductive plate according to the invention.

FIG. 3 is an example of the dot shaped light scattering coating. It can be seen that the coating rate increases with distance from the linear light source 7.

Figure 4:
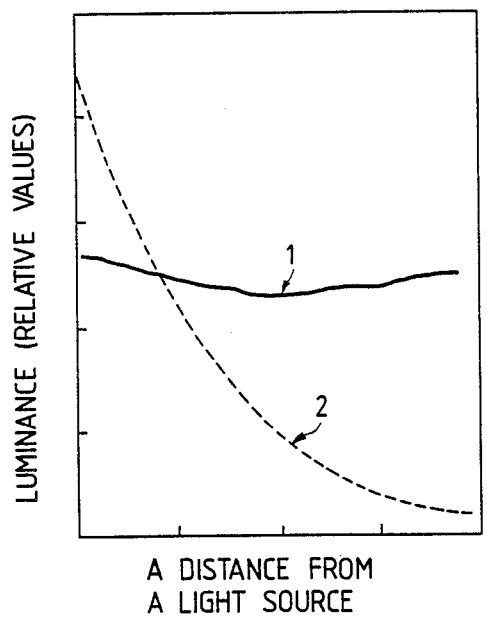
FIG. 4 is a diagram illustrating light transmitting states of a photo-conductive plate used in the present invention and of a photo-conductive plate uniformly treated with a light scattering material.

In FIG. 4, the solid line 1 is a graph of luminance versus distance from the light source for an arrangement in accordance with the invention described above. Dash line 2 represents luminance versus distance from the light source in an arrangement wherein a photo-conductive plate is uniformly coated with a light scattering material. This result teaches that substantially uniform luminance can be obtained all over the surface according to the present invention.

Figures 5, 6:
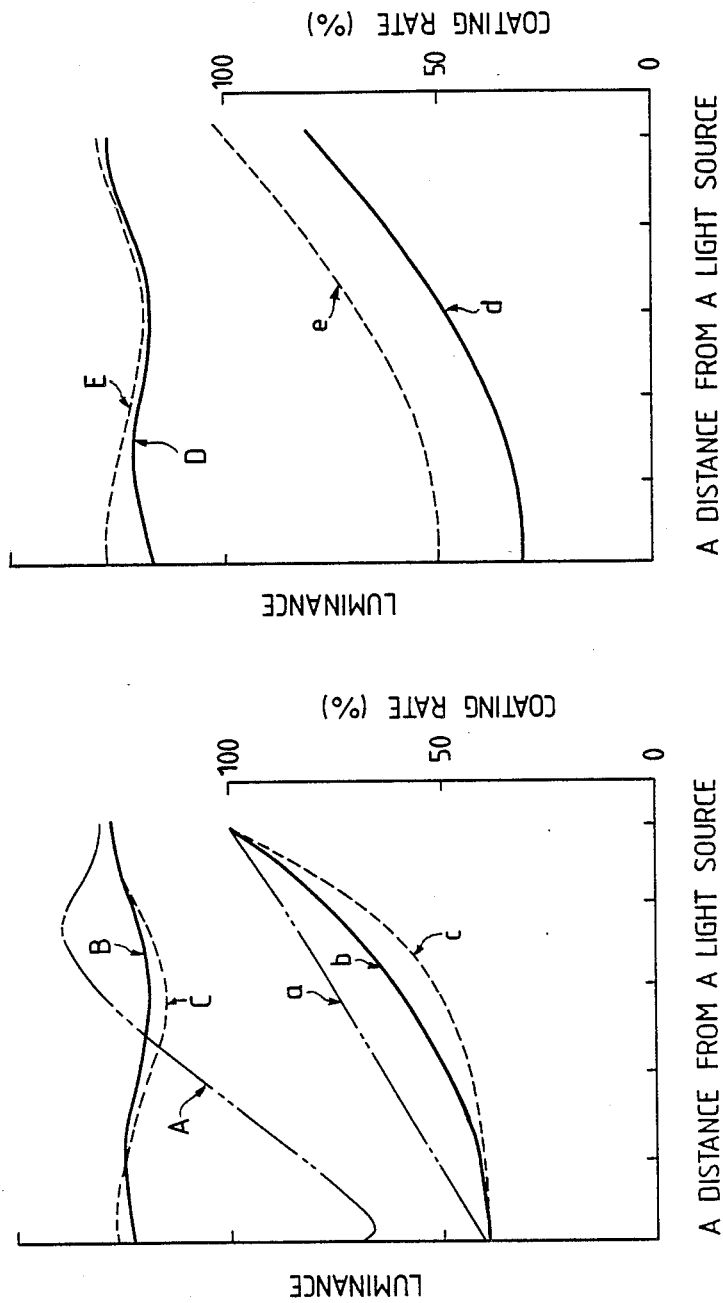
FIG. 5 is a diagram illustrating various luminance distribution patterns which differ from one another in accordance with the variation in the coating rate as one moves across the photo-conductive plate away from a light source.
FIG. 6 is a diagram illustrating the change of luminance distributions according to coating rate at starting and ending points.

FIG. 5 shows curves a, b, and c which represent, respectively, coating rates which are proportional to x, $x^{1.7}$, and $x^3$, respectively. For example, curve a represents a linear increase of coating versus distance x; curve b represents an increase of the order 1.7 versus distance x; etc. The curves A, B, and C represent the resulting luminance distribution patterns for the coating rate patterns a, b and c, respectively. It is apparent from FIG. 5 that it is preferable to increase the coating rate in proportion to a function of the order $1.7 \neq 3$ in order to make the luminance distribution flat.

FIG. 6 illustrates the relation between luminance distribution and a variation of the coating rate. The line d in FIG. 6 represents a coating having a coating rate of 30% at its start point and 80% at its end point. The resulting luminance distribution is represented by the line D. In the same manner, a coating having a coating rate of 50% at the start point and progressing to 100% at the end point is represented by the line The resulting luminance distribution is represented by the line E.

Generally, it is preferable that the coating rate across the surface varies from a starting coating rate of 3-50% to an ending coating rate of 80-100% in order to make the luminance distribution flat.

According to the present invention, since a light scattering material having a dot shape is distributed specifically while varying the coating rate thereof continuously, it is possible to radiate light uniformly onto a display face.

What is claimed:

1. A back light device for a liquid crystal panel comprising:
   a photo-conductive plate made of a transmissive material and having a light emitting surface;
   a linear light source provided close to at least one side end portion of said photo-conductive plate;
   one surface of said photo-conductive plate partially coated with a light scattering material having a refractive index higher than said transmissive material of said photo-conductive plate;
   a light reflecting plate covering said one surface of said photo-conductive plate partially coated with said light scattering material; and
   a light scattering plate provided on an opposite surface that is the light emitting surface of said photo-conductive plate,
   in which said photo-conductive plate is partially coated with said light scattering material so that a coating rate thereof is increased in proportion to $x^n$, where x is a distance from the linear light source, and n is a number from 1.7 to 3.

2. A back light device for a liquid crystal panel comprising:
   a photo-conductive plate made of a transmissive material and having a light emitting surface;
   a linear light source provided close to at least one side end portion of said photo-conductive plate;
   one surface of said photo-conductive plate partially coated with a light scattering material having a refractive index higher than said transmissive material of said photo-conductive plate;
   a light reflecting plate covering said one surface of said photo-conductive plate partially coated with said light scattering material; and
   a light scattering plate provided on an opposite surface that is the light emitting surface of said photo-conductive plate,
   in which said photo-conductive plate is dot-like coated with said light scattering material so that a coating rate thereof becomes larger as a distance from said linear light source is larger, and in which said photo-conductive plate is partially coated with said light scattering material so that a coating rate thereof is increased in proportion to $x^n$, where x is a distance from the linear light source, and n is a number from 1.7 to 3.

* * * * *